Figures 1, 2:
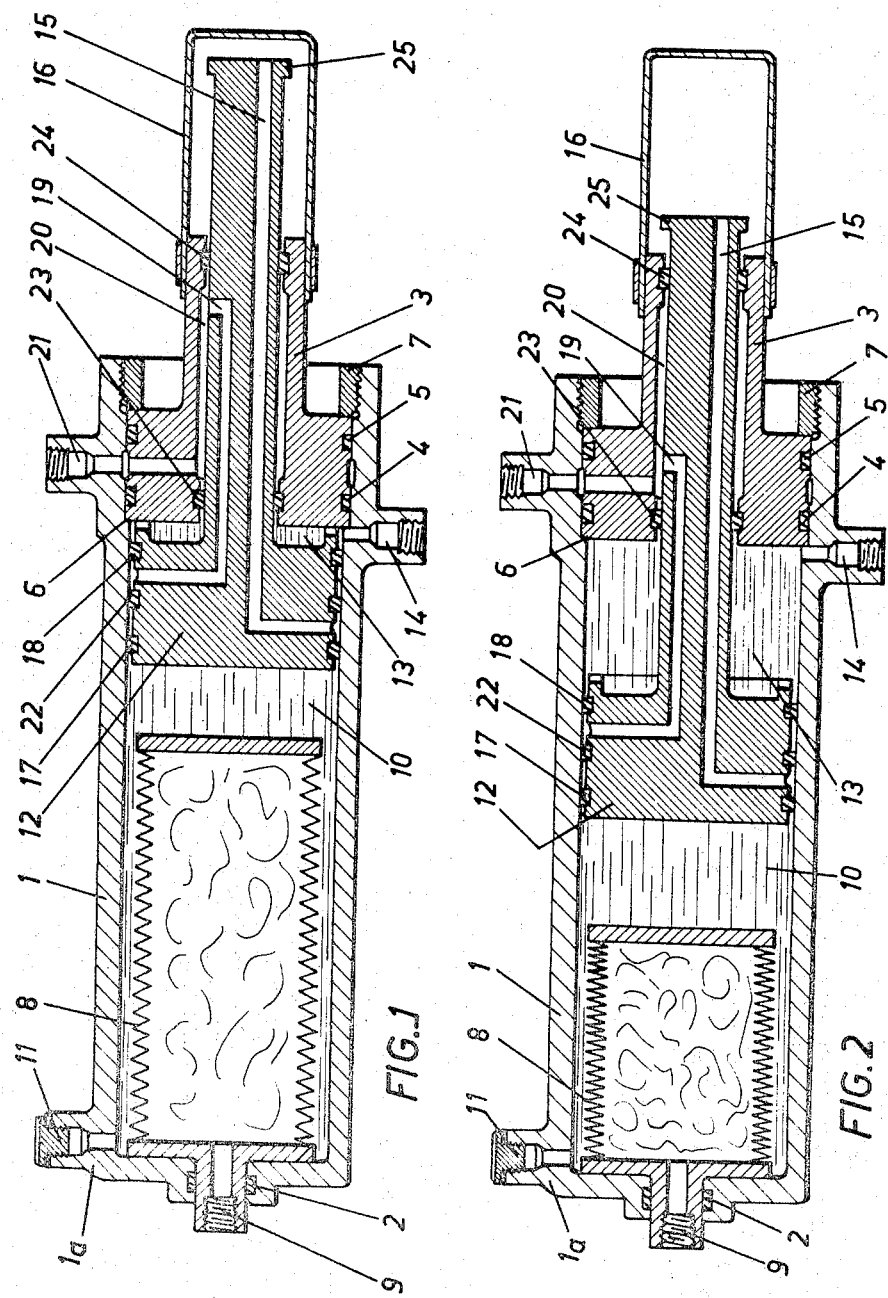

Aug. 22, 1967 R. LUCIEN 3,336,948
HYDRO-PNEUMATIC ACCUMULATOR
Filed Jan. 18, 1965

United States Patent Office 3,336,948
Patented Aug. 22, 1967

3,336,948
HYDRO-PNEUMATIC ACCUMULATOR
René Lucien, Neuilly-sur-Seine, France, assignor to Societe à Responsabilite Limitee Recherches Etudes Production R.E.P., Paris, France, a corporation of France
Filed Jan. 18, 1965, Ser. No. 426,076
Claims priority, application France, Jan. 17, 1964,
960,782, Patent 1,391,050
3 Claims. (Cl. 138—31)

The invention relates to a hydro-pneumatic accumulator designed particularly for applications where a safety factor in a hydraulic circuit is essential which is particularly important in hydraulic circuits for aerodynes.

It is known that in circuits of this type any possibility of gaseous fluid entering the hydraulic controlling fluid represents a great danger especially if the circuit is required to operate at high temperature.

Moreover any leakage of the gaseous component from a hydro-pneumatic accumulator impairs the normal operation of the latter.

The present invention satisfies the double condition of reducing the possibility of the gaseous component's escaping and, in any case, of strictly preventing the gaseous fluid from passing into the hydraulic fluid of the circuit of the aerodyne or of any other apparatus.

The invention resides in a combination of devices which comprise known elements but which are associated so as considerably to increase operating safety in relation to known hydro-pneumatic accumulators.

The hydro-pneumatic accumulator according to the invention is shown in axial longitudinal section in the accompanying drawing, in the so-called "inflating" position in FIG. 1 and in the operating position in FIG. 2.

It comprises a cylindrical casing 1 with an integral end wall 1a containing a small orifice with a sealing element 2.

At the opposite end, the cylindrical casing 1 receives an end wall formed by a wall member 3 which is provided with sealing elements 4, 5 and which is urged into contact with an abutment 6 provided on the inner surface of the cylindrical casing 1 by a nut 7.

Inside the cylindrical casing 1 in the region of the end wall 1a, a metallic bellows or collapsible container 8, which is entirely sealed by being welded or soldered, contains the gaseous fluid.

The end wall of the bellows 8 contains a single orifice having an internal screw thread 9 adapted to receive the inflating valve.

The bellows is accommodated in the airtight accumulation chamber 10 formed within the cylinder 1 which is filled with a hydraulic fluid through an orifice which is closed with a stopper 11. A piston 12 separates the chamber 10 from a working chamber 13 formed on the opposite side of the piston 12 and which is filled with the hydraulic fluid of the circuit, with which it communicates through the orifice 14.

A duct 15 provided in the piston 12 allows the hydraulic fluid in the chamber 10 to empty into a receiving case or leakage receiver box 16 carried by the wall member 3 in the event of failure of a sealing element 17 provided on the piston 12. The case 16 may be transparent so as to indicate any leakage across the sealing element 17.

A sealing element 18 also provided on piston 12 is subjected on one side to the high pressure of the fluid of the hydraulic circuit connected to the orifice 14. In the event of the sealing element 18 providing an imperfect seal a duct 19, also provided in the piston 12 allows the hydraulic fluid which has leaked across the sealing element 18 from the chamber 13 to discharge into an accessory leakage-recovery circuit towards a tank (not shown, as it does not form part of the invention) passing successively into a cavity 20 formed in the bottom end wall member 3 and into an orifice 21 provided in the cylindrical casing 1.

A sealing element 22 provided on the piston 12 prevents any fluid coming from the chamber 10 from passing towards the accessory leakage-recovery circuit 19, 20. There will be greater safety if the tank of the hydraulic circuit (not shown) is pressurized.

A sealing element 23 provided between the wall member 3 and the piston rod of the piston 12 is also subjecteed on one side to the high pressure of the hydraulic circuit. In the event of the seal 23 failing, the cavity 20 discharges the corresponding leakage towards the leakage-recovery circuit, while a sealing element 24 prevents the fluid from the case 16 from passing towards the leakage-recovery circuit.

The device thus described satisfies the double condition proposed in the following manner:

Inflation of the bellows 8 by the gaseous fluid is carried out, i.e. the accumulator is put in the inflated position (FIG. 1.)

As soon as the hydraulic circuit of the aerodyne is connected to the orifice 14 the pressurized hydraulic fluid of said circuit moves the piston 12 to the left as seen in the drawing, compressing the hydraulic fluid in chamber 10, the inflation pressure of the bellows 8 being less than the high pressure of the hydraulic circuit of the aerodyne. As the volume of gaseous fluid decreases its pressure rises so that the piston 12 stops in a poition of equilibrium, for example that shown in FIG. 2. A safety stop 25 carried by the piston 12 and located beyond this position may limit the stroke of piston 12.

It will be noted that the metallic bellows 8 is constantly subjected to the same pressure inside as outside, so that metal fatigue of the bellows is caused only by the variation in the length of the bellows; these operating conditions lengthen the life of the bellows and consequently reduce the risk of the gaseous fluid which it contains escaping and becoming mixed with the hydraulic fluid in the chamber 10.

If such failure were, however, to occur the presence of the sealing element 17 would still allow the accumulator to function correctly. In the event of the sealing element 17 itself failing the hydraulic and gaseous mixture would be discharged through the duct 15 into the receiving case 16. The mixture cannot in any event enter the high-pressure hydraulic circuit connected to the orifice 14 nor the leakage-recovery circuit 19, 20, 21.

I claim:

1. A hydro-pneumatic safety accumulator comprising a cylinder, a piston freely slidable in the cylinder and forming therein, on the one hand, a working chamber and, on the other, an airtight accumulation chamber, and in the said airtight accumulation chamber a deformable sealed bellows containing a gaseous fluid, a constant volume of hydraulic fluid in said accumulation chamber externally of said bellows separating the bellows from the said piston.

2. A hydro-pneumatic safety accumulator comprising a cylinder, a piston freely slidable in the cylinder and forming therein, on the one hand, a separate working chamber and, on the other, a sealed accumulation chamber, airtight metallic deformable bellows in said sealed accumulation chamber containing a gaseous fluid, a constant volume of hydraulic fluid in the accummulation chamber separating the bellows and gaseous fluid from the said piston, two piston packings mounted side by side on said piston and leaving a space therebetween, a leakage box mounted on the cylinder in a position remote from said accumulation chamber, and a rod on the said piston slidable in sealed manner through said cylinder, a leakage-receiver duct being provided in the said piston and rod, in communication with said space.

3. A hydro-pneumatic safety accumulator comprising a cylinder, a piston freely slidable in the cylinder and forming therein, on the one hand, a working chamber and, on the other, an airtight accumulation chamber, a sealed metallic bellows in said accumulation chamber containing a gaseous fluid, a constant volume of hydraulic fluid in the accumulation chamber separating the bellows and gaseous fluid from the said piston, three packings mounted side by side on said piston and defining two spaces therebetween, a leakage-receiver box mounted on the cylinder, a rod on said piston sliding in sealed relation through said cylinder remotely of said accumulation chamber, said cylinder being provided with a duct adapted for communicating with one of said spaces for the receiving and removal of leakages therefrom, said piston and rod being provided with another duct running from the other side of the spaces to the said leakage-receiver box.

References Cited

UNITED STATES PATENTS 2,683,467  7/1954  Greer _____ 138—31

LAVERNE D. GEIGER, *Primary Examiner.*

B. KILE, *Assistant Examiner.*